United States Patent
Varkey et al.

(10) Patent No.: US 11,725,468 B2
(45) Date of Patent: Aug. 15, 2023

(54) ELECTRICALLY CONDUCTIVE FIBER OPTIC SLICKLINE FOR COILED TUBING OPERATIONS

(71) Applicant: SCHLUMBERGER TECHNOLOGY CORPORATION, Sugar Land, TX (US)

(72) Inventors: Joseph Varkey, Sugar Land, TX (US); David Geehyun Kim, Stafford, TX (US); Maria Auxiliadora Grisanti, Stafford, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/546,207

(22) PCT Filed: Jan. 26, 2015

(86) PCT No.: PCT/US2015/012918
§ 371 (c)(1),
(2) Date: Nov. 14, 2017

(87) PCT Pub. No.: WO2016/122446
PCT Pub. Date: Aug. 4, 2016

(65) Prior Publication Data
US 2018/0073310 A1  Mar. 15, 2018

(51) Int. Cl.
*E21B 17/20* (2006.01)
*G02B 6/44* (2006.01)
*E21B 47/12* (2012.01)
*E21B 47/135* (2012.01)

(52) U.S. Cl.
CPC ............ *E21B 17/206* (2013.01); *E21B 47/12* (2013.01); *E21B 47/135* (2020.05); *G02B 6/4416* (2013.01); *G02B 6/4427* (2013.01)

(58) Field of Classification Search
CPC ..... E21B 47/12; E21B 47/123; G02B 6/4416; G02B 6/4427
See application file for complete search history.

(56) References Cited

U.S. PATENT DOCUMENTS

| 1,921,606 A | 8/1933 | Cremer |
| 1,937,054 A | 11/1933 | Cremer |

(Continued)

FOREIGN PATENT DOCUMENTS

| CN | 201188137 Y | 12/1899 |
| CN | 2609127 Y | 3/2004 |

(Continued)

OTHER PUBLICATIONS

Extended European Search Report issued in European Patent Appl. No. 15880350.2 dated Aug. 9, 2018; 9 pages.

(Continued)

*Primary Examiner* — D. Andrews
(74) *Attorney, Agent, or Firm* — Jeffrey D. Frantz

(57) ABSTRACT

A slickline that includes both electrically conductive and fiber optic capacity. The slickline includes a fiber optic thread or bundle of threads disposed in a support tube and surrounded by an electrically conductive member such as tightly wound copper threads. In certain embodiments, the electrically conductive member may be provided in direct contact with the support tube without the requirement of an insulating layer. Alternatively, the tube itself may be foregone with a channel for the fiber optic thread or bundle defined by insulating material about the electrically conductive member. Either way, the overall profile of the slickline may advantageously be kept to a minimum.

18 Claims, 6 Drawing Sheets

(56) References Cited

U.S. PATENT DOCUMENTS

| | | | |
|---|---|---|---|
| 1,987,041 A | 1/1935 | Wood | |
| 2,261,742 A | 11/1941 | Matsumoto | |
| 2,604,509 A | 7/1952 | Blanchard | |
| 2,927,954 A | 3/1960 | Ellsworth | |
| 3,115,542 A | 12/1963 | Palandri | |
| 3,217,083 A | 11/1965 | Gore | |
| 3,602,632 A | 8/1971 | Ollis | |
| 3,639,674 A | 2/1972 | Stier | |
| 3,784,732 A | 1/1974 | Whitfill, Jr. | |
| 4,131,757 A | 12/1978 | Felkel | |
| 4,131,758 A | 12/1978 | Felkel | |
| 4,160,872 A | 7/1979 | Lundberg et al. | |
| 4,183,621 A | 1/1980 | Kao et al. | |
| 4,227,770 A | 10/1980 | Gunn | |
| 4,341,440 A | 7/1982 | Trezeguet et al. | |
| 4,375,313 A | 3/1983 | Anderson et al. | |
| 4,389,645 A | 6/1983 | Wharton | |
| 4,408,828 A | 10/1983 | Le Noane et al. | |
| 4,422,718 A | 12/1983 | Nakagome et al. | |
| 4,440,974 A | 4/1984 | Naudet | |
| 4,491,386 A | 1/1985 | Negishi et al. | |
| 4,504,112 A | 3/1985 | Gould et al. | |
| 4,522,464 A | 6/1985 | Thompson et al. | |
| 4,523,804 A | 6/1985 | Thompson | |
| 4,524,436 A | 6/1985 | Hall et al. | |
| 4,563,757 A | 1/1986 | Decorps et al. | |
| 4,575,831 A | 3/1986 | Decorps et al. | |
| 4,577,925 A | 3/1986 | Winter et al. | |
| 4,579,420 A | 4/1986 | Winter et al. | |
| 4,623,218 A | 11/1986 | Laurette et al. | |
| 4,645,298 A | 2/1987 | Gartside, III | |
| 4,648,919 A | 3/1987 | Diaz et al. | |
| 4,654,476 A | 3/1987 | Barnicol-Ottler et al. | |
| 4,657,342 A | 4/1987 | Bauer | |
| 4,658,089 A | 4/1987 | Guzy et al. | |
| 4,675,474 A | 6/1987 | Neuroth | |
| 4,678,274 A | 7/1987 | Fuller | |
| 4,690,497 A | 9/1987 | Occhini et al. | |
| 4,696,542 A | 9/1987 | Thompson | |
| 4,705,353 A | 11/1987 | Wagoner | |
| 4,878,733 A | 11/1989 | Winter et al. | |
| 4,915,490 A | 4/1990 | Ramsay et al. | |
| 4,976,509 A | 12/1990 | Bachmann et al. | |
| 4,979,795 A | 12/1990 | Mascarenhas | |
| 5,086,196 A | 2/1992 | Brookbank et al. | |
| 5,115,485 A | 5/1992 | Gandy | |
| 5,202,944 A | 4/1993 | Riordan | |
| 5,222,178 A | 6/1993 | Betker et al. | |
| 5,275,038 A | 1/1994 | Sizer et al. | |
| 5,283,852 A | 2/1994 | Gibler et al. | |
| 5,329,605 A | 7/1994 | Wargotz | |
| 5,431,759 A | 7/1995 | Neuroth | |
| 5,493,626 A | 2/1996 | Schultz et al. | |
| 5,495,547 A | 2/1996 | Rafie et al. | |
| 5,590,803 A | 1/1997 | Kaempen | |
| 5,673,352 A | 9/1997 | Bauer et al. | |
| 5,761,361 A | 6/1998 | Pfandl et al. | |
| 5,787,217 A | 7/1998 | Traut et al. | |
| 5,982,965 A | 11/1999 | Cheron et al. | |
| 6,009,216 A | 12/1999 | Pruett et al. | |
| 6,030,255 A | 2/2000 | Konishi et al. | |
| 6,060,662 A | 5/2000 | Rafie et al. | |
| 6,192,983 B1 | 2/2001 | Neuroth et al. | |
| 6,195,487 B1 | 2/2001 | Anderson et al. | |
| 6,201,191 B1 | 3/2001 | Yorita et al. | |
| 6,211,467 B1 | 4/2001 | Berelsman et al. | |
| 6,236,789 B1 | 5/2001 | Fitz | |
| 6,255,592 B1 | 7/2001 | Pennington et al. | |
| 6,255,593 B1 | 7/2001 | Reede | |
| 6,260,656 B1 | 7/2001 | Orban et al. | |
| 6,262,009 B1 | 7/2001 | Rogers et al. | |
| 6,278,825 B1 | 8/2001 | Casiraghi et al. | |
| 6,281,489 B1 | 8/2001 | Tubel et al. | |
| 6,287,455 B1 | 9/2001 | Whitmore | |
| 6,297,455 B1 | 10/2001 | Wijnberg et al. | |
| 6,343,173 B2 | 1/2002 | Hordvik et al. | |
| 6,392,151 B1 | 5/2002 | Rafie et al. | |
| 6,400,873 B1 | 6/2002 | Gimblet et al. | |
| 6,403,889 B1 | 6/2002 | Mehan et al. | |
| 6,404,961 B1 | 6/2002 | Bonja et al. | |
| 6,445,859 B1 | 9/2002 | Witt | |
| 6,463,199 B1 | 10/2002 | Quinn et al. | |
| 6,472,614 B1 | 10/2002 | Dupont et al. | |
| 6,496,627 B1 | 12/2002 | Tuminaro | |
| 6,531,694 B2 | 3/2003 | Tubel et al. | |
| 6,555,752 B2 | 4/2003 | Dalrymple et al. | |
| 6,600,108 B1 | 7/2003 | Mydur et al. | |
| 6,621,964 B2 | 9/2003 | Quinn et al. | |
| 6,714,708 B2 | 3/2004 | McAlpine et al. | |
| 6,727,828 B1 | 4/2004 | Malone et al. | |
| 6,779,927 B2 | 8/2004 | Cens et al. | |
| 6,924,436 B2 | 8/2005 | Varkey et al. | |
| 6,960,724 B2 | 11/2005 | Orlet et al. | |
| 6,968,106 B2 | 11/2005 | Chastain et al. | |
| 6,973,246 B2 | 12/2005 | Bocanegra et al. | |
| 6,978,077 B2 | 12/2005 | Park | |
| 7,005,583 B2 | 2/2006 | Varkey et al. | |
| 7,009,113 B2 | 3/2006 | Varkey | |
| 7,015,395 B2 | 3/2006 | Goldsworthy et al. | |
| 7,119,283 B1 | 10/2006 | Varkey et al. | |
| 7,140,435 B2 | 11/2006 | Defretin et al. | |
| 7,170,007 B2 | 1/2007 | Varkey et al. | |
| 7,179,019 B2 | 2/2007 | Seto et al. | |
| 7,188,406 B2 | 3/2007 | Varkey et al. | |
| 7,208,855 B1 | 4/2007 | Floyd | |
| 7,235,743 B2 | 6/2007 | Varkey | |
| 7,259,331 B2 | 8/2007 | Sridhar et al. | |
| 7,288,721 B2 | 10/2007 | Varkey et al. | |
| 7,294,787 B2 | 11/2007 | Varkey | |
| 7,324,730 B2 | 1/2008 | Varkey et al. | |
| 7,326,854 B2 | 2/2008 | Varkey | |
| 7,402,753 B2 | 7/2008 | Varkey et al. | |
| 7,438,971 B2 | 10/2008 | Bryant et al. | |
| 7,462,781 B2 | 12/2008 | Varkey et al. | |
| 7,465,876 B2 | 12/2008 | Varkey | |
| 7,603,011 B2 | 10/2009 | Varkey et al. | |
| 7,763,802 B2 * | 7/2010 | Varkey | H01B 7/046 |
| | | | 174/106 R |
| 7,860,362 B2 | 12/2010 | Varkey et al. | |
| 7,912,333 B2 | 3/2011 | Varkey et al. | |
| 8,213,756 B2 | 7/2012 | Herbst | |
| 8,861,911 B2 | 10/2014 | Shin et al. | |
| 8,870,858 B2 | 10/2014 | Zerfas | |
| 8,929,701 B2 | 1/2015 | Lowell et al. | |
| 8,929,702 B2 | 1/2015 | Varkey et al. | |
| 9,093,191 B2 | 7/2015 | Hiel et al. | |
| 9,201,207 B2 | 12/2015 | Varkey et al. | |
| 9,488,793 B2 | 11/2016 | Register, III | |
| 9,631,224 B2 | 4/2017 | Ohga et al. | |
| 9,641,066 B2 | 5/2017 | Tsuruoka et al. | |
| 11,335,478 B2 | 5/2022 | Varkey et al. | |
| 2001/0020675 A1 | 9/2001 | Tubel et al. | |
| 2001/0023614 A1 | 9/2001 | Tubel et al. | |
| 2001/0040041 A1 | 11/2001 | Pennington et al. | |
| 2002/0007948 A1 | 1/2002 | Bayne et al. | |
| 2002/0085819 A1 | 7/2002 | Stottlemyer et al. | |
| 2002/0159726 A1 | 10/2002 | Brown et al. | |
| 2003/0042019 A1 | 3/2003 | Harkins et al. | |
| 2003/0081917 A1 | 5/2003 | Bussear | |
| 2003/0099443 A1 | 5/2003 | Karnik et al. | |
| 2003/0099446 A1 | 5/2003 | Witt et al. | |
| 2003/0165309 A1 | 9/2003 | Moon et al. | |
| 2004/0045735 A1 | 3/2004 | Varkey et al. | |
| 2004/0091215 A1 | 5/2004 | Barnoski et al. | |
| 2004/0109650 A1 | 6/2004 | Kim et al. | |
| 2004/0118590 A1 | 6/2004 | Head | |
| 2004/0262027 A1 | 12/2004 | Kaczmarski | |
| 2005/0117858 A1 | 6/2005 | Lee et al. | |
| 2005/0194578 A1 | 9/2005 | Morris | |
| 2005/0236161 A1 * | 10/2005 | Gay | E21B 47/123 |
| | | | 166/380 |
| 2005/0281517 A1 | 12/2005 | Wessels, Jr. et al. | |
| 2006/0045442 A1 | 3/2006 | Varkey et al. | |
| 2006/0182398 A1 | 8/2006 | Dowd et al. | |

(56) References Cited

U.S. PATENT DOCUMENTS

| | | | |
|---|---|---|---|
| 2006/0193572 | A1 | 8/2006 | Mjelstad |
| 2006/0280412 | A1 | 12/2006 | Varkey |
| 2008/0024297 | A1 | 1/2008 | Maki et al. |
| 2008/0031578 | A1 | 2/2008 | Varkey et al. |
| 2008/0118209 | A1 | 5/2008 | Varkey et al. |
| 2008/0289851 | A1 | 11/2008 | Varkey et al. |
| 2009/0046983 | A1 | 2/2009 | Varkey et al. |
| 2009/0196557 | A1 | 8/2009 | Varkey et al. |
| 2010/0074583 | A1 | 3/2010 | Varkey et al. |
| 2010/0116510 | A1 | 5/2010 | Varkey et al. |
| 2011/0005795 | A1* | 1/2011 | Deighton ............... H01B 7/045 174/47 |
| 2011/0139447 | A1 | 6/2011 | Ramos et al. |
| 2011/0234421 | A1 | 9/2011 | Smith |
| 2011/0240312 | A1 | 10/2011 | Varkey et al. |
| 2012/0222869 | A1 | 9/2012 | Varkey |
| 2013/0084044 | A1 | 4/2013 | Ertel et al. |
| 2014/0367121 | A1* | 12/2014 | Varkey ................. G02B 6/4416 385/101 |
| 2015/0013975 | A1* | 1/2015 | McColpin ............ E21B 47/123 166/255.1 |
| 2015/0170799 | A1* | 6/2015 | Varkey ................. H01B 13/067 174/70 R |
| 2016/0222736 | A1 | 8/2016 | Varkey et al. |

FOREIGN PATENT DOCUMENTS

| | | |
|---|---|---|
| CN | 2631012 Y | 8/2004 |
| CN | 2653528 Y | 11/2004 |
| CN | 2762296 Y | 3/2006 |
| CN | 202196616 U | 4/2012 |
| DE | 2818656 A1 | 10/1979 |
| DE | 29816469 U1 | 12/1998 |
| EP | 0203249 A2 | 12/1986 |
| EP | 0241724 A2 | 10/1987 |
| EP | 0342855 A2 | 5/1989 |
| EP | 0405851 A1 | 6/1990 |
| EP | 0853249 A1 | 12/1997 |
| EP | 1004914 A1 | 11/1998 |
| EP | 2097609 A1 | 9/2009 |
| EP | 2520962 A1 | 7/2012 |
| GB | 2177231 A | 1/1987 |
| GB | 2275953 A | 9/1994 |
| GB | 2444362 A | 4/2008 |
| JP | 547186 A | 1/1979 |
| JP | S6029715 A | 2/1985 |
| JP | 61013208 A | 1/1986 |
| JP | 2216710 A | 8/1990 |
| JP | H03145014 A | 6/1991 |
| JP | 492110 A | 3/1992 |
| NL | 1019447 C2 | 6/2003 |
| RU | 2066871 A | 9/1996 |
| WO | 9641066 A1 | 12/1996 |
| WO | 0005612 A1 | 2/2000 |
| WO | 2006131871 A2 | 12/2006 |
| WO | 2006135513 A1 | 12/2006 |
| WO | 2007066146 A2 | 6/2007 |
| WO | 2012012679 A2 | 1/2012 |
| WO | 2012015868 A2 | 2/2012 |
| WO | WO2012071101 A1 | 5/2012 |
| WO | WO2012170080 A1 | 12/2012 |
| WO | 2014004026 A1 | 1/2014 |
| WO | WO-2014004026 A1 * | 1/2014 ........... G02B 6/4416 |

OTHER PUBLICATIONS

International Search Report and Written Opinion issued in International Patent Appl. No. PCT/US2015/012918 dated Sep. 11, 2015; 17 pages.
Lebedev et al., The Breakdown Strenghth of Two-Layer Dielectrics, Tomsk Polytechnic University, Tomsk, Russia #4.304.P2, High VoltageEngineering Symposium, Aug. 22-27, 1999, 4 pages.
Salama et al., Instructional Design of Multi-Layer Insulation of Power Cables, Transactions on Power systems, vol. 7, No. 1, Feb. 1992, pp. 377-382.
Examination Report under Sections 18(3) of United Kingdom Patent Application GB1422687.2 dated Aug. 1, 2019, 38 pages.
Exam Report issued in related EP Patent Application No. 12841787.0 dated Feb. 12, 2018.
Exam Report issued in related EP Patent Application No. 12841787.0 dated Mar. 13, 2019, 6 pages.
Exam Report issued in related EP Patent Application No. 12841787.0 dated Feb. 24, 2020, 5 pages.
Exam Report issued in Canadian Patent Application 2851877 dated Aug. 23, 2018, 4 pages.
Exam Report issued in EP Patent Application No. 15880350.2 dated May 19, 2020, pages.
Second Office Action issued in the related CN Application 201410383942.4, dated Sep. 12, 2017, 7 pages.
Third Office Action issued in the related CN Application 201410383942. 4, dated Apr. 11, 2018, 8 pages.
Fourth Office Action issued in the related CN Application 201410383942.4, dated Jan. 3, 2019, 3 pages. No Translation Provided.
Rejection decision issued in the related CN Application 201410383942. 4, dated Apr. 26, 2019, 4 pages. No Translation Provided.
First Office Action and Search Report issued in CN Application 201610825946.0 dated Feb. 2, 2019, 8 pages. No Translation Provided.
Second Office Action and Search Report issued in CN Application 201610825946.0 dated Oct. 12, 2019, 12 pages with English Translaiton.
Third Office Action and Search Report issued in CN Application 201610825946.0 dated Apr. 23, 2020, 14 pages with English Translation.
Office Action issued in U.S. Appl. No. 14/408,022 dated Jan. 21, 2016, 13 pages.
Office Action issued in U.S. Appl. No. 14/408,022 dated Jun. 10, 2016, 11 pages.
Office Action issued in U.S. Appl. No. 14/408,022 dated Oct. 23, 2016, 11 pages.
Office Action issued in U.S. Appl. No. 14/408,022 dated Mar. 7, 2017, 11 pages.
Office Action issued in U.S. Appl. No. 14/408,022 dated Jun. 23, 2017, 13 pages.
Office Action issued in U.S. Appl. No. 14/408,022 dated Nov. 24, 2017, 11 pages.
Office Action issued in U.S. Appl. No. 14/352,394 dated Apr. 3, 2017, 11 pages.
Office Action issued in U.S. Appl. No. 15/546,207 dated Oct. 15, 2018, 16 pages.
Office Action issued in U.S. Appl. No. 15/546,207 dated Jul. 5, 2019, 10 pages.
Office Action issued in U.S. Appl. No. 15/546,207 dated Nov. 20, 2019, 10 pages.
Office Action issued in U.S. Appl. No. 15/546,207 dated Mar. 9, 2020, 10 pages.
Office Action issued in U.S. Appl. No. 15/546,207 dated Sep. 11, 2020, 10 pages.
Office Action issued in U.S. Appl. No. 15/546,207 dated Dec. 3, 2020, 10 pages.
Office Action issued in U.S. Appl. No. 10/931,736 dated Jun. 5, 2007, 9 pages.
Office Action issued in U.S. Appl. No. 11/461,943 dated Oct. 19, 2007, 7 pages.
Office Action issued in U.S. Appl. No. 11/461,943 dated Apr. 30, 2008, 8 pages.
Office Action issued in U.S. Appl. No. 11/461,943 dated Aug. 22, 2008, 7 pages.
Office Action issued in U.S. Appl. No. 11/461,943 dated Feb. 26, 2009, 9 pages.
Office Action issued in U.S. Appl. No. 11/461,943 dated Aug. 11, 2009, 9 pages.
Office Action issued in U.S. Appl. No. 11/461,943 dated Oct. 28, 2009, 7 pages.

(56) References Cited

OTHER PUBLICATIONS

Office Action issued in U.S. Appl. No. 12/623,059 dated Jun. 11, 2010, 6 pages.
Office Action issued in U.S. Appl. No. 12/623,059 dated Nov. 17, 2010, 6 pages.
Office Action issued in U.S. Appl. No. 12/623,059 dated Jun. 13, 2011, 12 pages.
Office Action issued in U.S. Appl. No. 12/623,059 dated Jan. 6, 2012, 13 pages.
Office Action issued in U.S. Appl. No. 12/365,200 dated Jul. 14, 2010, 7 pages.
Office Action issued in U.S. Appl. No. 11/751,349 dated Apr. 7, 2009, 8 pages.
Office Action issued in U.S. Appl. No. 11/751,349 dated Nov. 16, 2009, 9 pages.
Office Action issued in U.S. Appl. No. 11/751,349 dated Jun. 25, 2010, 7 pages.
Office Action issued in U.S. Appl. No. 11/751,349 dated Mar. 7, 2011, 10 pages.
Office Action issued in U.S. Appl. No. 11/751,349 dated Dec. 20, 2012, 10 pages.
Office Action issued in U.S. Appl. No. 11/751,349 dated Sep. 9, 2013, 10 pages.
Office Action issued in U.S. Appl. No. 11/751,349 dated Mar. 4, 2014, 8 pages.
Office Action issued in U.S. Appl. No. 15/177,616 dated Jul. 3, 2017, 12 pages.
Summons to attend Oral Proceedings issued in European Patent Application No. 12841787.0 dated Jul. 12, 2022, 8 pages.
Office Action issued in U.S. Appl. No. 17/724,808 dated Nov. 25, 2022, 16 pages.
Examination Report issued in Canadian Patent Application 2851877 dated Aug. 27, 2019, 5 pages.
Exam Report issued in EP Patent Application No. 15880350.2 dated Oct. 17, 2019, 5 pages.
Exam Report issued in EP Patent Application No. 12841787.0 dated Oct. 2, 2020, 7 pages.
Exam Report issued in EP Patent Application No. 15880350.2 dated Feb. 22, 2021, 5 pages.
Office Action Issue in U.S. Appl. No. 16/724,432 dated Mar. 3, 2021, 17 pages.

\* cited by examiner

ELECTRICALLY CONDUCTIVE FIBER OPTIC SLICKLINE FOR COILED TUBING OPERATIONS

BACKGROUND

Exploring, drilling and completing hydrocarbon and other wells are generally complicated, time consuming, and ultimately very expensive endeavors. In recognition of these expenses, added emphasis has been placed on efficiencies associated with well completions and maintenance over the life of the well. So, for example, enhancing efficiencies in terms of logging, perforating or any number of interventional applications may be of significant benefit, particularly as well depth and complexity continues to increase.

One manner of enhancing efficiencies for interventional applications involves outfitting coiled tubing tools and equipment with power or telemetric capacity. Thus, applications requiring real-time communications or power may be run in, or upon traversing, tortuous or horizontal well sections. That is, coiled tubing may forcibly provide access to such well locations so that a logging tool or perforating gun may perform a logging or perforating application at or beyond such sections.

In the case of a coiled tubing logging application, a telemetric line is disposed through the coiled tubing so as to provide communication between the logging tool and surface equipment at the oilfield. In this manner, operators may be provided with real-time position and well characteristic information. However, as opposed to a conventional wireline application, the telemetric line for the coiled tubing logging application is to be run through coiled tubing as noted. Thus, instead of utilizing a thick or larger diameter power-delivery line which might be more challenging to pump through the coiled tubing, a lighter, fiber-optic tether or "slickline" may be utilized to provide telemetry or communications between the logging tool and the surface equipment.

While adept at providing the benefits of a low-profile and lightweight means of data transmission, the fiber optic slickline remains devoid of any electrically conductive capacity. That is, in contrast to the above noted wireline cable, the fiber optic slickline is devoid of the heavier electrical cabling. While this is advantageous for reasons noted hereinabove, it means that reliance on a dedicated, space consuming, downhole power source is still required. Thus, the power available to monitoring equipment is limited to the constraints of such a power source. Once more, as noted above, application tools of greater power requirements than a logging tool may be utilized at the end of the coiled tubing such as where a perforating gun is provided for sake of a perforating application.

In addition to the challenges directly related to the lack of dedicated power, a fiber optic tether or slickline is of a naturally lower strength to weight ratio thereby limiting overall depth capabilities. Once more, the problems associated with power limitations and current construction of fiber optic slickline do not lend to merely adding in an electrical line. For example, inserting a separate electrical line into the metal tube might address the lack of surface available power. However, a dedicated power line would tend to increase the overall diameter of the slickline. Indeed, when considering conventional insulating and other layers of the added electrical line, the slickline may begin to take on dimensions and weight more characteristic of wireline. Thus, the advantage of utilizing slickline may begin to be lost.

At present, in the case of coiled tubing applications that utilize telemetry, distributed measurements, and powered application tools, operators are generally left with the only practical option of a fiber optic slickline lacking electrically conductive capacity. As a result, a dedicated downhole power source is provided for the tool which is of limited total power capacity and having the undesirable characteristic of eating up space on the tool assembly.

SUMMARY

A downhole assembly is provided that includes a tool for performing an application in a well and an electrically conductive fiber optic slickline coupled to the tool in the well and to surface equipment at the oilfield adjacent the well. The slickline comprises a core with a fiber optic thread for communication between the tool and the equipment. The core also comprises a conductive member circumferentially about the thread for power transmission from the equipment to the tool during the application. In an embodiment, the conductive member is embedded within a molded support which defines a conduit through which the thread is run.

DETAILED DESCRIPTION

Embodiments are described with reference to certain tools and coiled tubing applications run in a well over slickline. As defined herein, the term "slickline" refers to an application that is run over a conveyance line that is substantially below about 0.25 inches in overall outer diameter. That is, as opposed to a higher profile or diameter wireline cable, downhole applications detailed herein are run over a relatively low diameter slickline. Additionally, the embodiments detailed herein are described with reference to particular perforating applications and tools that are advanced through the well with the aid of coiled tubing. These embodiments employ a fiber optic electrical core that includes fiber optic thread with an electrically conductive member disposed about the core to render a practical and effective electrically conductive fiber optic slickline.

Figure 1A:
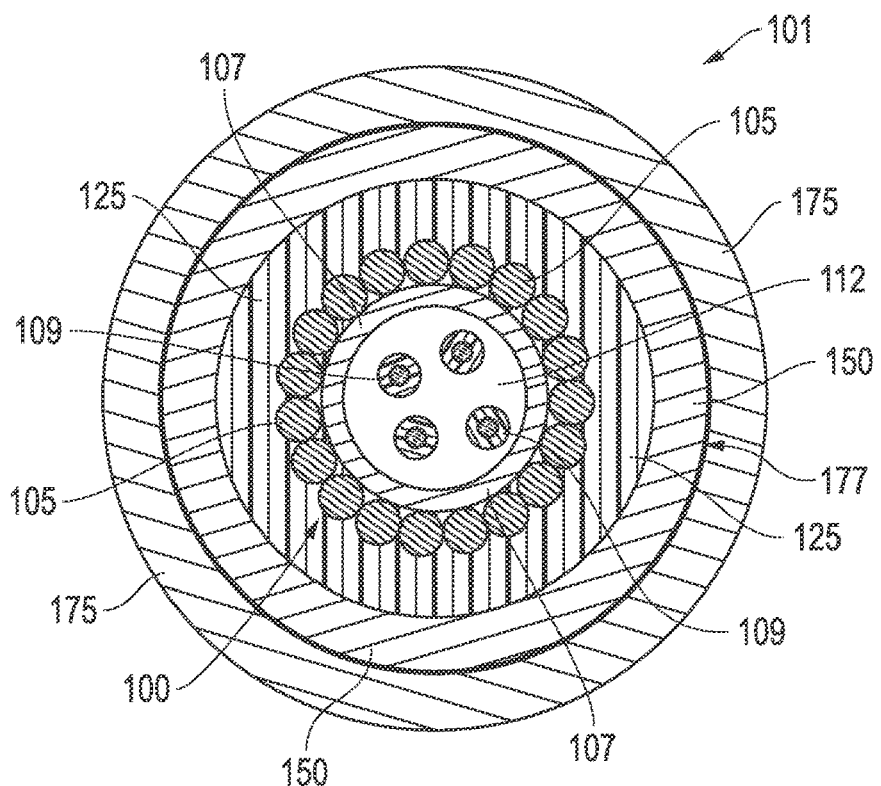
FIG. 1A is a cross-sectional view of an embodiment of a fiber optic coaxial electrical slickline for use in coiled tubing applications.

Referring specifically now to FIG. 1A, a cross-sectional view of an embodiment of a fiber optic coaxial electrical slickline 101 is shown for use in coiled tubing applications. That is, with added reference to FIG. 2, the slickline 101 may be pumped through coiled tubing 215 and used to provide a connection between a downhole tool 277, such as a perforating gun, and surface equipment 225. The features of the slickline 101 are such that this connection may be used to provide power, distributed measurements, and telemetry, such as transmitting commands to and receiving information between the tool 277 and the surface equipment 225. More specifically, the core 100 of the slickline includes fiber optic threads 109 for telemetry and/or measurements, such as distributed measurements, whereas electrical members 105 are provided for delivering power to the downhole tool 277. However, in certain embodiments, the electrical members 105 may also be utilized for telemetry.

In the embodiment of FIG. 1A, the electrical members 105 are coaxial conductors or threads. However, with added reference to FIG. 1B, alternative member configurations may be utilized such as those of a half-shell configuration 106. Regardless, the members 105, 106 are of copper or other suitably conductive metal-based material given the environment in which the slickline 101 (or 102) is to be utilized. For example, even where the slickline 101, 102 and coiled tubing 215 of FIG. 2 are upwards of 35,000 feet in length, the members 105, 106 may provide upwards of 100 Watts or more to downhole tools from the surface equipment 225. Thus, sufficient power may be made available to the perforating gun 277 for the application at hand. In the case of a perforating application as depicted, this may include the ability to monitor and perform analysis with an associated logging tool 275, to transmit commands to trigger the perforating of the gun 277, or to transmit commands to actuate a valve or valves in the tool 275.

Figure 1B:
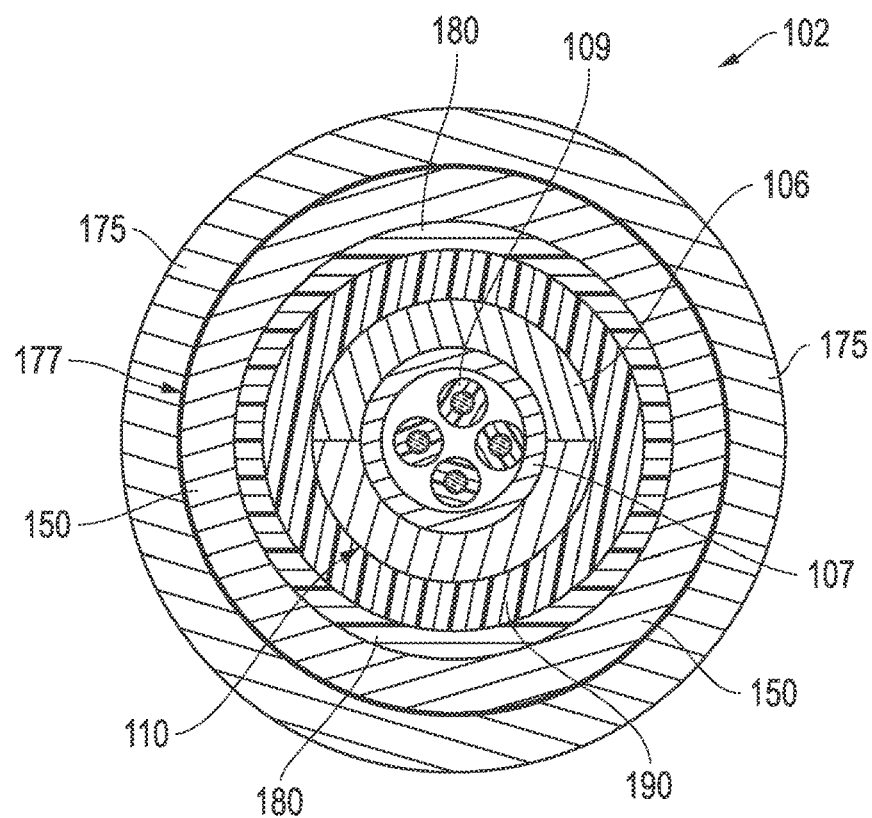
FIG. 1B is a cross-sectional view of an embodiment of a fiber optic half-shell electrical slickline for use in coiled tubing applications.
Figure 2:
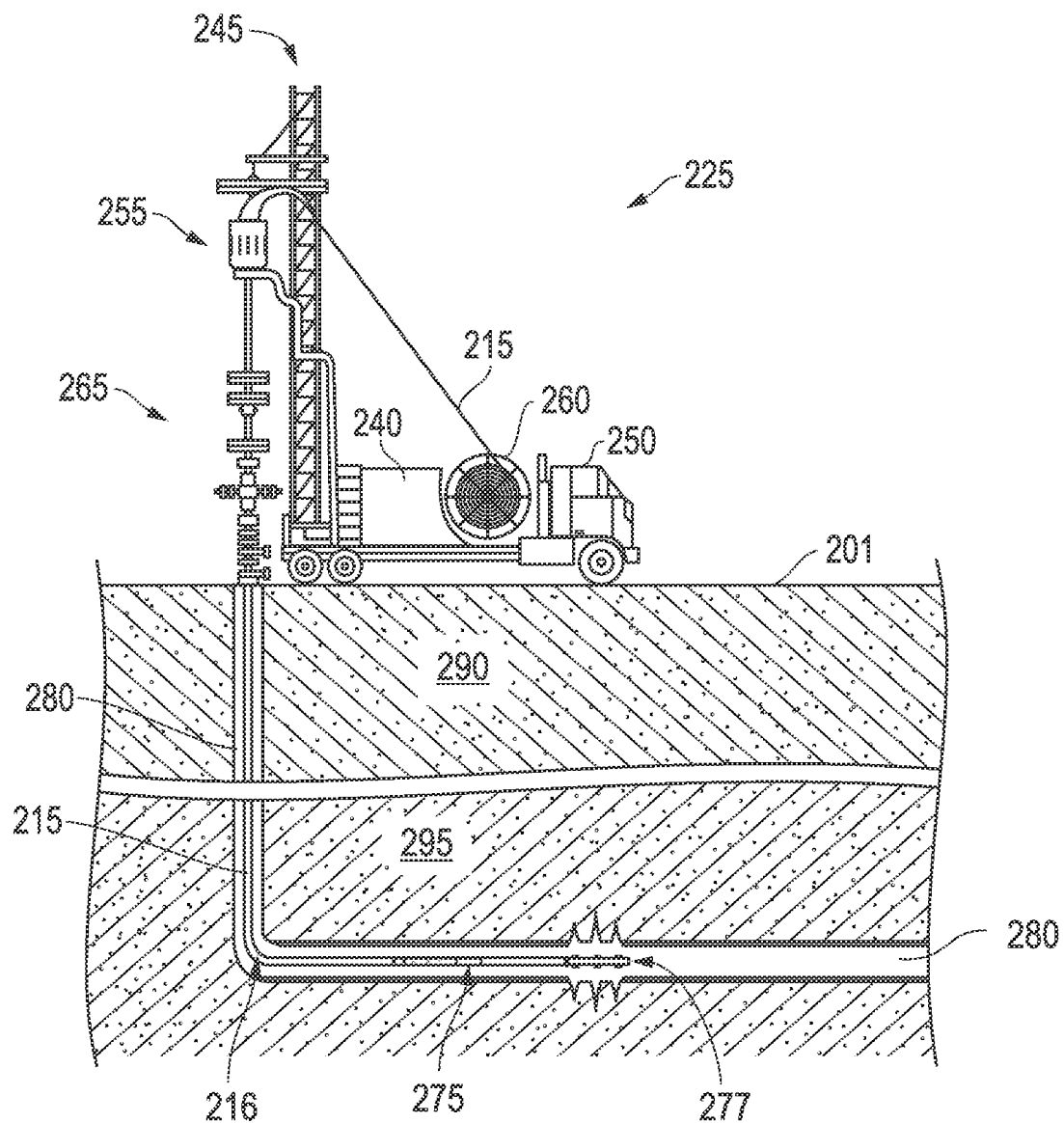
FIG. 2 is an overview of an oilfield with a well accommodating the coiled tubing for an application that utilizes an embodiment of slickline as shown in one of FIGS. 1A and 1B.

In contrast to more conventional powered cables, such as wireline cable, the slickline 101, 102 of FIGS. 1A and 1B is configured to be run through coiled tubing 215 as noted above and depicted in FIG. 2. Thus, while power delivery may be sought as noted above, minimizing the overall diameter of the slickline 101, 102 may also be advantageous to allow for running through a coiled tubing 215 having its own diameter limitations. For example, slickline 101, 102 embodiments herein may have an overall outer diameter of less than about 0.15 inches even though a substantial portion of the slickline 101, 102 is occupied by conductive members 105, 106 capable of delivering power to the extent noted above. Keeping the slickline diameter limited to no more than about 0.15 inches while also accommodating fiber optics, substantial conductive members 105, 106 and adequate insulating and supportive components may be attained through unique configurations as described further below here. The coiled tubing 215 defines an internal flow path 216 for delivery of treatment fluid or the like to a downhole tool such as, but not limited to, a treatment tool, or the like, discussed in more detail hereinbelow.

Continuing with reference to FIGS. 1A and 1B, the fiber optic threads 109 may be loosely run through a metallic tube 107. A conventional polymer jacket may be present about each individual thread 109. However, as noted, the conduit 112 defined by the tube 107 may be left void of any filler material so as to allow a degree of flexibility and independence between the threads 109 and the remainder of the slickline 101, 102. So, for example, stresses on outer portions of the slickline 101, 102 may be less likely to translate over to the threads 109. However, this also means that the threads 109 are subject to a degree of movement within the conduit 112 including regular contact with the inner wall of the metallic tube 107. As shown in the embodiments of FIGS. 1A and 1B, conductive members 105, 106 are placed immediately adjacent the metallic tube 107.

As opposed to the conventional manner of insulating the members 105, 106 from the underlying metallic tube 107, these members 105, 106 are intentionally left un-insulated relative the tube 107. As a result, even the tube 107 may take on charged conductive behavior as power is transferred over the members 105, 106. In turn, this may leave the underlying threads 109 exposed to a degree of charge. However, given that the mode of telemetry for the slickline 101, 102 is to use jacketed threads 109 that are fiber optic in nature, no marked effect would be expected. That is, even in circumstances where the metallic tube 107 becomes charged by power carrying conductive members 105, 106, contact between the charged tube 107 and the threads 109 would not markedly affect the light-based fiber optic telemetry that is utilized through the threads 109.

With specific reference to FIG. 1A, the coaxial conductive members 105 may be helically wound about the underlying metal tube 107 sufficiently tight enough to avoid notable slippage between these components during manufacture and use of the slickline 101. Indeed, in the embodiment shown, the tube 107 is up to about 98% or more covered by the wound members 105. Further, an insulating polymer layer 125 may be extruded over the members 105 for providing electrical isolation from metal-based cladding layers 150, 175. However, the absence of a similar isolating layer between the members 105 and the metal tube 107 of the core 100 provides a practical manner of utilizing separate dedicated telemetric (109) and power (105) lines without adding substantially to the overall diameter of the slickline 101. Ultimately such a configuration may render a slickline 101 that may be about 10-20% smaller in diameter as compared to one in which the same components are utilized but with an insulating layer located between the members 105 and the metal tube 107.

In addition to the insulating polymer layer 125, an added polymer jacket, such as a foam polymer layer, or refractive tape may be utilized there-over (external to the polymer layer 125) to provide increased protection to the underlying fiber optic threads 109 from compression forces, heat and other processing hazards during manufacture of the slickline 101. Such materials may include reinforced carbon fiber, fluoropolymers or foamed polymers to absorb compression and prevent substantial optical losses.

Figure 1C:
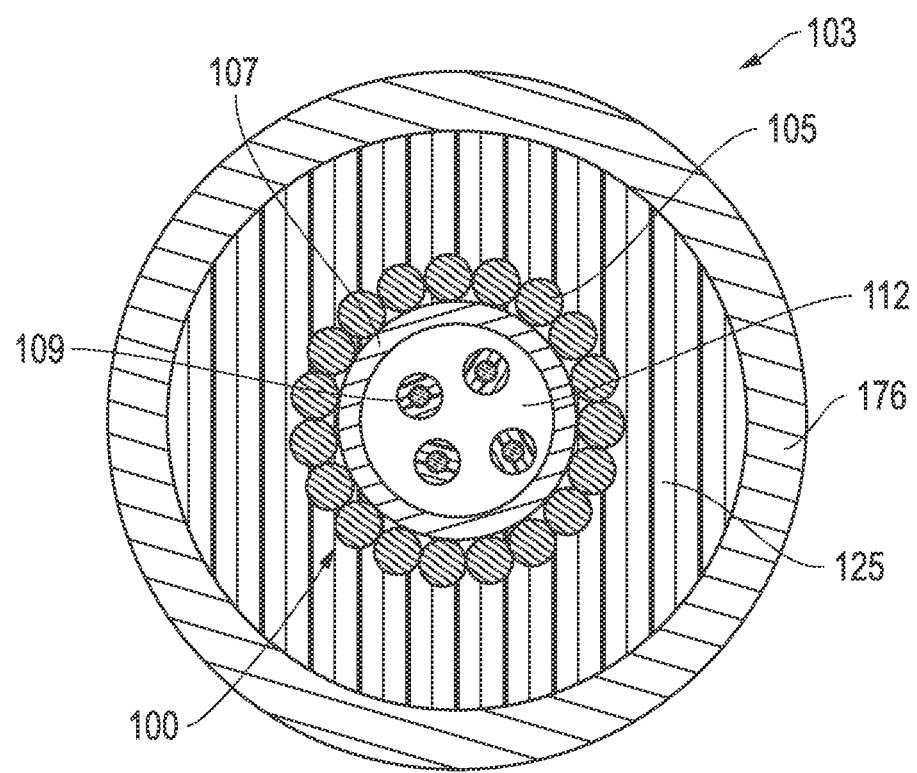
FIG. 1C is a cross-sectional view of an embodiment of a fiber optic coaxial electrical slickline for use in coiled tubing applications.

Continuing with reference to FIG. 1A, double cladded layers 150, 175 are also utilized as noted above. These layers 150, 175 may provide durable shell for the slickline 101 and also be coupled to downhole electronics and/or application coiled tubing 215 so as to serve as conductive grounding members (see also FIG. 2). The thicknesses of these layers 150, 175 may depend upon diameter limitations for the slickline 101, as well as desired strength and flexibility. In the embodiment shown a small gap is present between these layers 150, 175 where a supportive layer of polymer 177 is located to again protect underlying components from compression and/or heat during manufacture. This supportive layer 177 of polymer may again comprise reinforced carbon fiber, fluoropolymer, foamed polymer or other suitable supportive polymer type. In an embodiment, best seen in FIG. 1c, a slickline 103, similar to the slickline 101, may comprise a single cladded layer 176 in lieu of layers 150, 175 shown in FIGS. 1a and 1b. The thickness of this single layer 176 may depend upon diameter limitations for the slickline 101, 102, as well as desired strength and flexibility.

With particular reference to the embodiment depicted in FIG. 1B, a cross-sectional view slickline 102 for use in coiled tubing applications is shown which utilizes half-shell electrically conductive members 106 at its core 110 as noted above. As with the coaxial members 105 of FIG. 1A, the half-shell members 106 may provide power and even telemetry where called for. Due to the shape of these members 106, the underlying metallic tube 107 may be completely encased and covered by the members 106 in a substantially conformal fashion and without the need for any intervening insulating layer therebetween as detailed above. However, an insulating layer 190 may be provided exteriorly about these members 106 to provide electrical isolation from metal-based cladding layers 150, 175.

Again though, in the embodiment of FIG. 1B, there remains an absence of an isolating layer between the members 106 and the metal tube 107 of the core 110. This provides a practical manner of utilizing separate dedicated telemetric (109) and power (106) lines without adding substantially to the overall diameter of the slickline 102. As with the embodiment of FIG. 1A, such a configuration may render a slickline 102 that is about 10-20% smaller in diameter as compared to one in which the same components are utilized but with an insulating layer located between the members 106 and the metal tube 107. Once more, in the embodiment of FIG. 1B, a single pair of half-shell members 106 is utilized. However, in other embodiments, the core 110 may include multiple pairs of members 106, for example, each surrounding an individual fiber optic thread 109. Nevertheless, in the embodiment shown, where a single pair of half-shell members 106 is utilized, advantages may be realized in terms of both space savings and user friendliness (e.g. in terms of manually terminating each member 106 at a downhole tool location).

Continuing with reference to FIG. 18, in addition to the insulating polymer layer 190, an added polymer jacket or protective layer 180 or refractive tape may be utilized there-over to provide increased protection to the underlying core 110 from compression forces, heat and other processing hazards during manufacture of the slickline 102. Such materials may comprise reinforced carbon fiber, fluoropolymers or foamed polymers to absorb compression and prevent substantial optical losses.

Referring now to FIG. 2, an overview of an oilfield 201 is shown with a well 280 traversing various formation layers 290, 295. As depicted, coiled tubing 215 is run through the well 280 to deliver a perforating gun 277 for sake of a perforating application. This coiled tubing includes the noted gun 277 as well as a logging tool 275 and potentially other devices that may benefit from both telemetry, distributed measurements and/or power from surface equipment 225. Thus, the coiled tubing 215 may be outfitted with an embodiment of slickline 101, 102 such as detailed above and depicted in FIGS. 1A and 1B.

As shown in FIG. 2, a logging application may take place as the coiled tubing 215 is run through a deviated section of the well 280. With added reference to FIGS. 1A and 1B, a slickline 101, 102 may be disposed within an interior of the coiled tubing 215 that is communicatively coupled to the logging tool 275. Thus, characteristics of the well 280 over the various formation layers 290, 295 may be detected by way of the tool 275. Once more, the fiber optic nature of the slickline 101, 102 allows for certain detections or measurements, such as, but not limited to, temperature, pressure, strain and/or vibration readings, to be taken directly with fiber optic threads 109 apart from the noted tool 275. Such temperature, strain, pressure, and/or vibration readings may include distributed temperature sensing (DTS), distributed pressure sensing (DPS), distributed strain and temperature sensing (DSTS), distributed vibration sensing (DVS), heated DTS and others as discussed further below which utilize the fiber optic threads 109 and may be appreciated by those skilled in the art. Additionally, to the extent necessary, the tool 275 may be effectively powered without reliance on a downhole power source. That is, as noted above, the electrically conductive nature of the slickline 101, 102 allows power for the tool 275 to be obtained from surface equipment 225. In an embodiment, telemetry may be accomplished with the conductive members 105 instead of the optical fibers 109, such as in the event of a failure of one or more of the optical fibers 109.

In the embodiment shown, the surface equipment 225 includes a power control unit 240 that may be coupled to the coiled tubing 215 by way of a reel 260. Thus, as indicated, effective powering of the downhole tool 275 may be surface directed as well as the overall coiled tubing application. Additionally, data from the tool 275 (or directly from slickline 101, 102 of FIG. 1A or 1B) may be analyzed in real-time.

In this embodiment, a mobile coiled tubing truck 250 is utilized for deployment of the slickline equipped coiled tubing 215 via a conventional gooseneck injector 255 with supportive rig 245. Thus, the coiled tubing 215 may be forcibly injected past pressure control equipment 265 and through the tortuous well 280 for the logging application. Once more, the low profile, yet power capable slickline 101, 102 that is utilized through the coiled tubing 215 allows for additional perforating and potentially other applications to be adequately directed and powered from surface (see FIGS. 1A and 1B). In a non-limiting embodiment, the wellbore device or tool 275 may comprise a measurement device to measure a property and generate an output and an interface device to convert the output from the measurement device to an optical or electrical signal. The property may be any property that can be measured in a borehole such as, but not limited to, pressure, temperature, distributed temperature, pH, amount of precipitate, fluid temperature, depth, chemical luminescence, gamma-ray, resistivity, salinity, fluid flow, fluid compressibility, viscosity, compression, stress, strain, tool location, tool state, tool orientation, and combinations thereof. In some embodiments, the tool 275 may comprise a device to enter a predetermined branch of a multi-lateral well. In particular embodiments, the wellbore may be a multilateral well and the measured property be a tool orientation or a tool position. Types of wellbore devices and/or tools 275 may comprise a camera, a caliper, a feeler, a casing collar locator, a sensor, a temperature sensor, a chemical sensor, a pressure sensor, a proximity sensor, a resistivity sensor, an electrical sensor, an actuator, an optically activated tool, a chemical analyzer, a flow-measuring device, a valve actuator, a firing head actuator, a tool actuator, a reversing valve, a check valve, and a fluid analyzer. The wellbore device or tool 275 may be provided power and telemetry by the cable 101, 102, 301, 302, 500 or the like. A variety of wellbore and/or coiled tubing operations or applications may be performed, such as matrix stimulation, fill cleanout, fracturing, scale removal, zonal isolation, perforation, downhole flow control, downhole completion manipulation, well logging, fishing, drilling, milling, measuring a physical property, locating a piece of equipment in the well, locating a particular feature in a wellbore, controlling a valve, and controlling a tool, as will be appreciated by those skilled in the art.

Figure 3A:
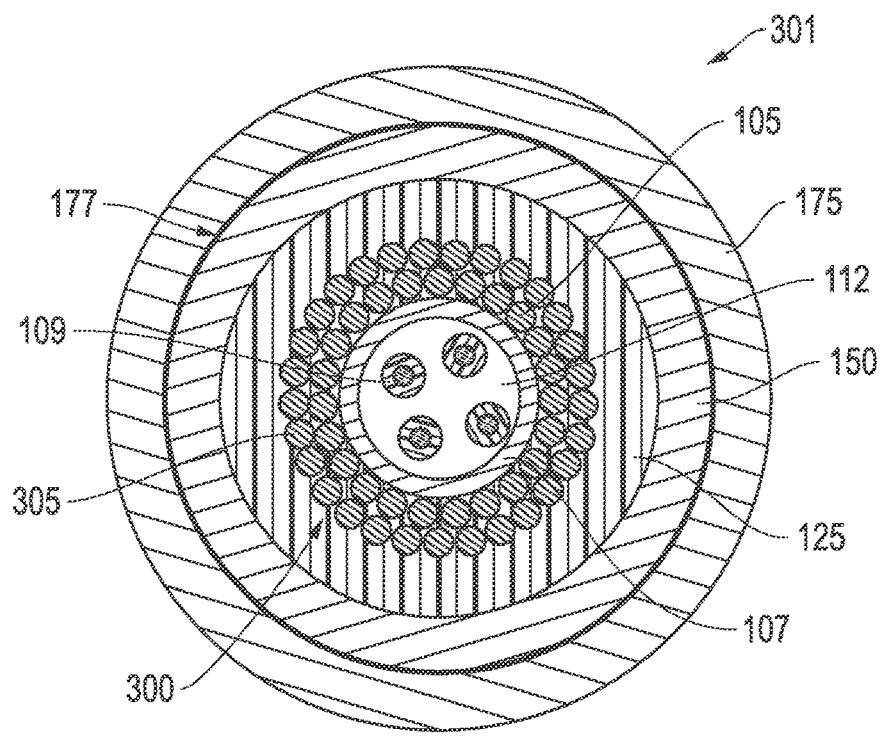
FIG. 3A is a cross-sectional view of another embodiment of fiber optic coaxial electrical slickline for use in coiled tubing applications.

Referring now to FIG. 3A, a cross-sectional view of another embodiment of fiber optic coaxial electrical slickline 301 is shown that may be utilized in coiled tubing applications such as that depicted in FIG. 2. In this embodiment, the core 300 includes the fiber optic threads 109 disposed in a conduit 112 of a metallic tube 107 as with the embodiments of FIGS. 1A and 1B. Similarly, electrically conductive members 105 are again wound directly about the tube 107. However, in the embodiment of FIG. 3A, a second layer of coaxial electrically conductive members 305 are also wound about the exterior of the members 105. Thus, the space that is saved in eliminating an insulating layer between the initial members 105 and the metallic tube 107 as detailed above, is now, to a certain degree, exchanged for the introduction of an added layer of members 305. In total, this may translate into as much as about a 20% or more increase in the power delivery capability of the slickline 101, 102, 103.

As with the embodiments of FIGS. 1A and 1B, an added insulating polymer layer 125 may be utilized on the exterior of the underlying conductive member layers 105, 305. Thus, isolation from outer cladding layers 150, 175 may again be provided as well as additional processing and manufacturing protection. Indeed, the same holds true for the embodiment of FIG. 3B discussed herebelow.

Figure 3B:
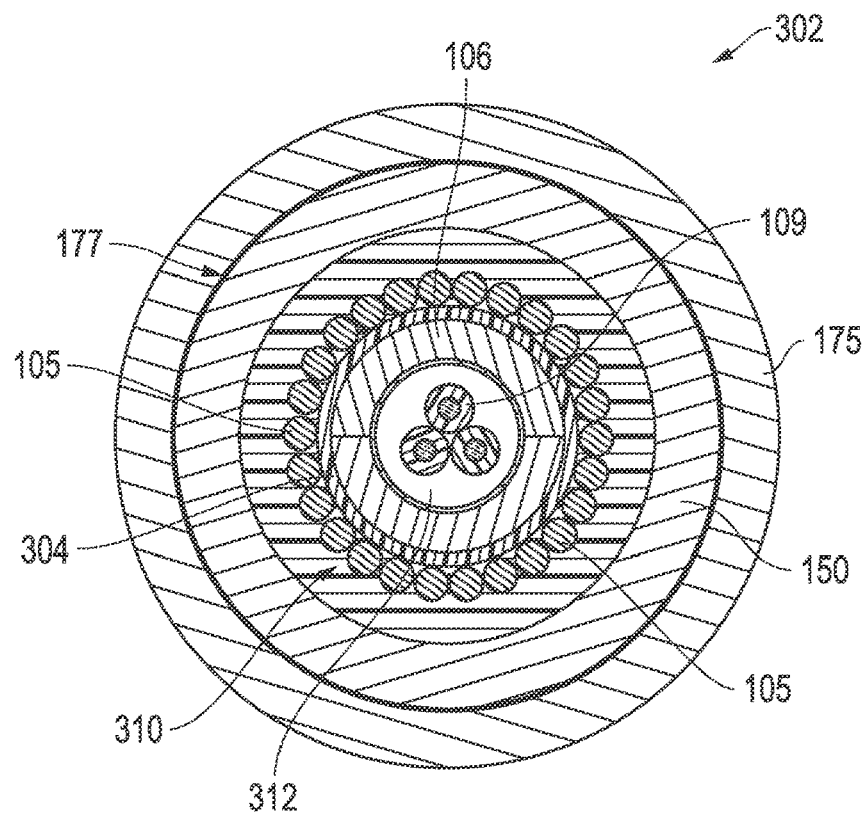
FIG. 3B is a cross-sectional view of an embodiment of a fiber optic combined coaxial and half-shell electrical slickline for use in coiled tubing applications.

Referring specifically now to FIG. 3B, a cross-sectional view of an embodiment of a fiber optic combined coaxial and half-shell electrical slickline 302 is shown that may be utilized in coiled tubing applications such as that depicted in FIG. 2. As alluded to, in this embodiment, for power delivery, the core 310 includes both a pair of half-shell conductive members 106 as well as coaxial conductive members 105. However, in this embodiment, the half-shell members 106 may be used to define the conduit 312 through which the fiber optic threads 109 are run. A layer of insulating polymer 304 may be present about the half-shell members 106 to provide isolation between relative the adjacent coaxial members 105. In an embodiment, a layer of insulating polymer, similar to the layer 304, may be disposed between the conductive members 105 and metal tube 107 of FIGS. 1a, 1c, 3a, or between the half-shell members 106 and metal tube 107 of FIG. 1b.

Utilizing multiple modes of power delivery in this manner may allow for more power to be delivered similar to the embodiment of FIG. 3A. Alternatively, however, since these modes (105 and 106) are isolated from one another, they may be utilized differently from one another. For example, in an embodiment, the half-shell members 106 may be utilized to power one downhole tool while the coaxial members 105 are utilized to power another downhole tool. In an embodiment, one of the members 105, 106 may be dedicated to power delivery, for example, whereas the other is used as a grounding return path.

In an embodiment, an insulating or polymer protective layer may also be present at the interior of the half-shell members 106 defining the conduit 312. Thus, the half-shell members 106 may not be exposed directly to the conduit 312. However, it is worth noting that in the embodiment of FIG. 3B, a substantial isolating layer is not required for insulating the fiber optic threads 109 from potential charge of the half-shell members 106.

In the embodiment shown, the conduit 312 may be filled with a hydrogen scavenging gel occupying the space around the fiber optic threads 109. The hydrogen scavenging gel may prevent moisture from collecting in the conduit 312. The hydrogen scavenging gel (and other types of gels) may be effective, at non-extreme temperatures, to reduce the amount of hydrogen darkening that may affect the life of the fibers 109. Of course, such a gel may be located in the conduits 112 of other embodiments as well, perhaps depending on the temperatures expected downhole for the given slickline 101, 102, 301 (see FIGS. 1A, 1B and 3A).

Figure 4:
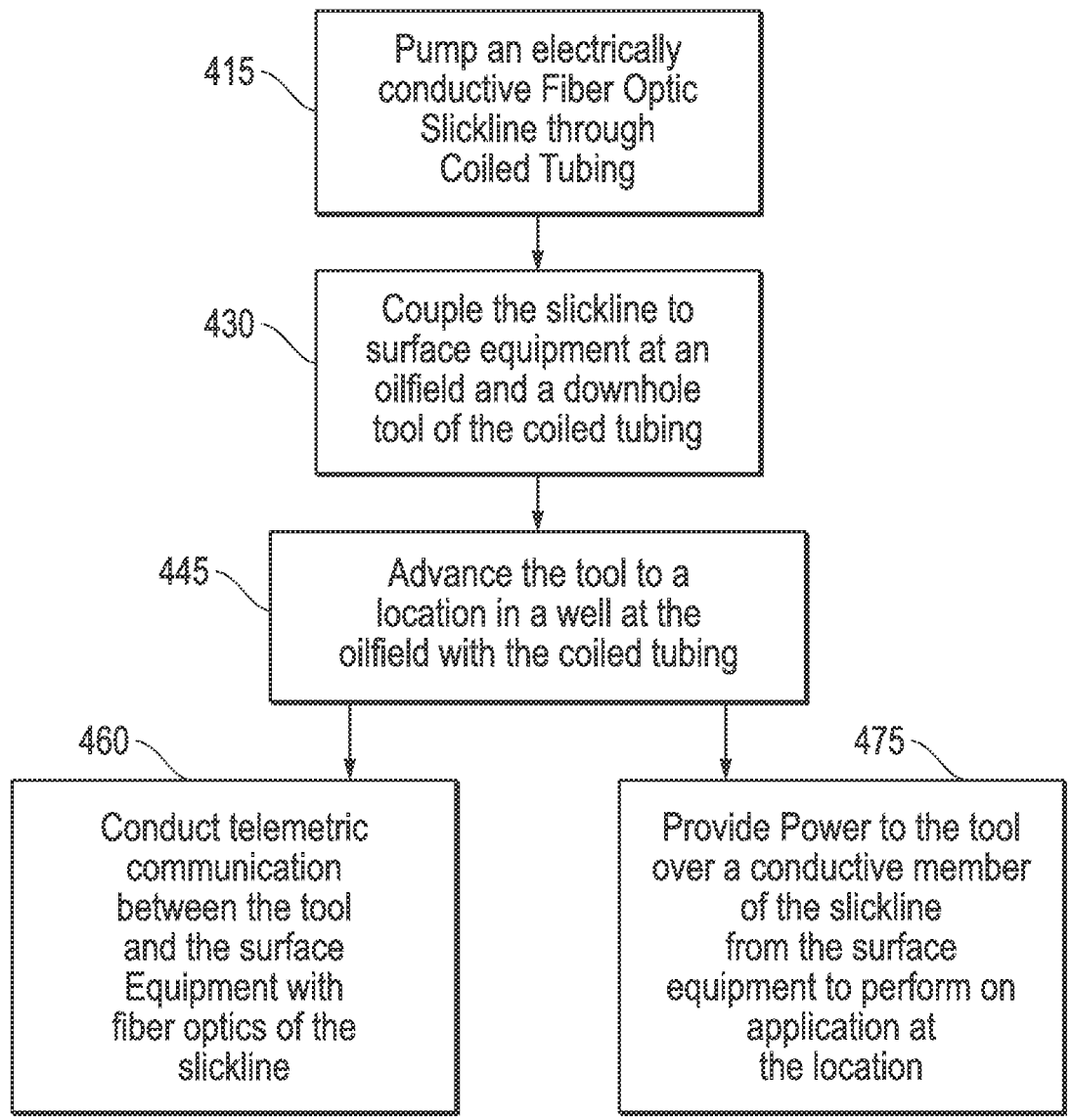
FIG. 4 is a flow-chart summarizing embodiments of utilizing fiber optic electrical slickline to run a coiled tubing interventional application in a well.

Referring now to FIG. 4, a flow-chart is depicted which summarizes embodiments of utilizing fiber optic electrical slickline to run a coiled tubing interventional application in a well. For example, a slickline such as those depicted in FIGS. 1A, 1B, 3A and 3B may be pumped through coiled tubing as indicated at 415. In this manner the coiled tubing may be outfitted with a slickline that is equipped with fiber optic telemetry, distributed measurement capability, and power transferring capability while at the same time remaining of a profile adequately small enough to be utilized in the flow path 216 of the coiled tubing 215. Thus, as indicated at 430, the slickline may be coupled at one end to surface equipment at an oilfield and at the other end to one or more downhole tools that are deployable via the coiled tubing. Accordingly, the coiled tubing may be used to advance downhole tools to a particular location in the well (see 445). The robustness of the fiber optic slickline 101, 102, 301, 302, allows the slickline 101, 102, 301, 302, to provide telemetry and/or power at an extensive range of fluid flow rates through the fluid flow path 216 during wellbore operations (such as including flow rates up to those flow rates typically seen in hydraulic fracturing operations and the like, as will be appreciated by those skilled in the art) and fluid types (including viscous fluids such as gels and the like) while maintaining its structural integrity. The slickline 101, 102, 301, 302 may be utilized with wellbore operations such as, but not limited to, a fluid pumping operation, a fracturing operation, an acidizing operation, a drilling operation, a coiled tubing operation, matrix stimulation, fill cleanout, fracturing, scale removal, zonal isolation, perforation, downhole flow control, downhole completion manipulation, well logging, fishing, drilling, milling, measuring a physical property, locating a piece of equipment in the well, locating a particular feature in a wellbore, controlling a valve, and controlling a tool, as will be appreciated by those skilled in the art.

Ultimately, this means that the tool may engage in telemetric communication with the surface equipment as indicated at 460 while also being powered to perform an application by the surface equipment as noted at 475. By way of specific example, downhole tools such as logging and perforating tools may engage in telemetric communication with the surface equipment, before, during or even after a perforating application. This telemetric communication may take place over the fiber optics of the slickline of the coiled tubing. At the same time, electrically conductive members of the slickline may be used to deliver power to these downhole tools to power these downhole tools and/or applications.

Figure 5A:
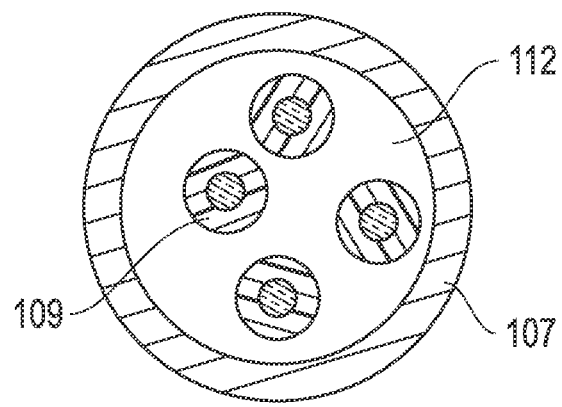
FIG. 5A is a cross-sectional view of an embodiment of a fiber optic metal tubular core of a fiber optic electrical slickline.

Referring now to FIG. 5A, a cross-sectional view of an embodiment of the metallic tube 107 defining the conduit 112 for the fiber optic threads 109 is shown, alone. Thus, a brief revisiting of embodiments such as those of FIG. 1A or 3A, with focus on the fiber optic threads 109, is rendered. These threads 109 provide the telemetric capacity as described herein. Additionally, however, the threads 109 may support distributed measurement of downhole distances, single or double ended distributed temperature sensing (DTS), distributed strain and temperature sensing (DSTS), distributed vibration sensing (DVS), distributed fluid velocity sensing (DFVS), heated distributed fluid velocity sensing (HDFVS). Indeed, the threads 109 may be left loosely suspended as shown in part to ensure effective distributed sensing applications as indicated.

Figure 5B:
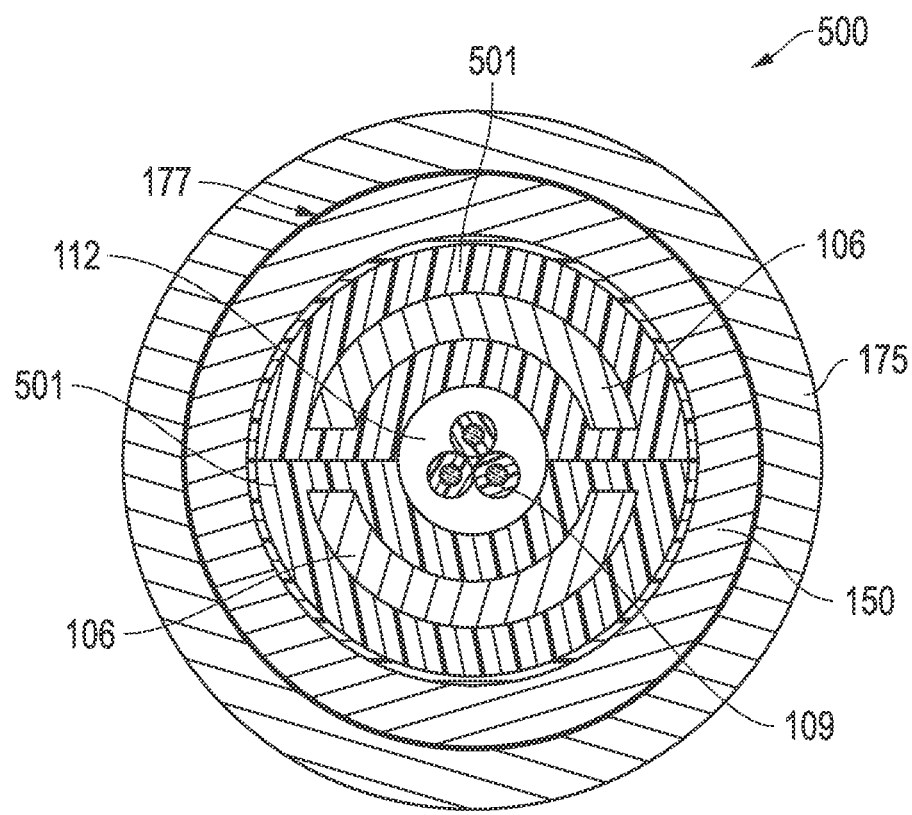
FIG. 5B is a cross-sectional view of an embodiment of a fiber optic electrical slickline utilizing a tubeless core.

Referring now to FIG. 5B, a cross-sectional view of an embodiment of a fiber optic electrical slickline 500 is shown that utilizes a tubeless core. That is, similar to the embodiment of FIG. 3B, half-shell conductive members 106 may be utilized to define the conduit 112 through which the fiber optic threads 109 are run. However, in this embodiment, the half-shell members 106 are entirely extruded with a continuous polymer layer 501 thereabout. Thus, the polymer layer 501 directly defines the conduit 112.

Additionally, the fibers 109 may be bundled together so as to behave in a more cohesive manner, for example, as compared to the looser manner in which the fibers 109 are located in the conduit 112 of other embodiments such as that of FIG. 5A. In an embodiment, this bundle or micro-bundle of fibers 109 may even be held together by a single polymer jacket surrounding all of the fibers 109 simultaneously within the conduit 112.

As with other embodiments, the slickline 500 of FIG. 5B may comprise double cladded layers 150, 175 to provide a durable shell which may also be coupled to downhole electronics and/or coiled tubing 215 (see also FIG. 2). The thicknesses of these layers 150, 175 may depend upon diameter limitations for the slickline 101, as well as desired strength and flexibility. In the embodiment shown, a small gap is present between these layers 150, 175 where a supportive layer of polymer (such as the polymer 177 shown in FIG. 1a) is located to again protect underlying components from compression and/or heat during manufacture. This supportive layer of polymer may again be reinforced carbon fiber, fluoropolymer, foamed polymer or other suitable supportive polymer type. In an embodiment, the slickline 500 may comprise a single cladded layer to replace the layers 150, 175, similar to the embodiment shown in FIG. 1c. The thicknesses of this single layer may depend upon diameter limitations for the slickline 101, 102, as well as desired strength and flexibility.

Embodiments detailed hereinabove include slickline capable of providing telemetry and power to downhole tools while remaining of an adequately low profile to allow for practical use of the slickline in combination with coiled tubing applications. This may be achieved in a variety of manners and the preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Regardless, the foregoing description should not be read as pertaining only to the precise structures described and shown in the accompanying drawings, but rather should be read as consistent with and as support for the following claims, which are to have their fullest and fairest scope.

We claim:

1. An electrically conductive fiber optic cable configured to be disposed within a flow path of coiled tubing, the coiled tubing accommodating a downhole tool for an application in a well at an oilfield, the fiber optic cable comprising:
   a polymer jacketed fiber optic thread disposed through a void space defined by a conduit of the fiber optic cable to support optical telemetry between surface equipment at the oilfield and the downhole tool;
   a plurality of coaxial, electrically conductive members helically wound about the conduit, wherein the plurality of electrically conductive members are configured to provide power to the downhole tool from the surface equipment, the plurality of coaxial, electrically conductive members located exteriorly adjacent the conduit in an un-insulated manner relative to the conduit;
   an insulating polymer layer over the plurality of coaxial, electrically conductive members; and
   a single metal based cladding layer extending circumferentially about the insulating polymer layer, wherein the single metal based cladding layer has a first thickness such that the single metal based cladding layer provides a durable shell for the insulating polymer layer.

2. The electrically conductive fiber optic cable of claim 1, wherein the plurality of coaxial, electrically conductive members are configured to provide telemetry between the surface equipment and the downhole tool.

3. The electrically conductive fiber optic cable of claim 1, wherein the polymer jacketed fiber optic thread is configured to directly provide a distributed measurement to the surface equipment, the distributed measurement selected from a category consisting of temperature sensing, pressure sensing, vibration sensing, strain sensing, and fluid velocity sensing.

4. The electrically conductive fiber optic cable of claim 1, wherein the polymer jacketed fiber optic thread provides a distributed measurement to the surface equipment.

5. The electrically conductive fiber optic cable of claim 1, wherein a metallic tube defines the conduit and accommodates the plurality of coaxial electrically conductive members thereover.

6. The electrically conductive fiber optic cable of claim 1, wherein the plurality of coaxial electrically conductive members are jacketed by a polymer to protect the conduit from exposure.

7. The electrically conductive fiber optic cable of claim 1, further comprising:
   a first protective polymer layer extending circumferentially about the insulating polymer layer; and
   a second protective polymer layer extending circumferentially about the single metal based cladding layer; and
   a second metal based cladding layer extending circumferentially about the second protective polymer layer, wherein the second metal based cladding layer has a second thickness such that the second metal based cladding layer forms the exterior surface of the fiber optic cable and provides a second durable shell for the second protective polymer layer, wherein the second metal based cladding layer is coupled to the downhole tool and used as a grounding return path for the downhole tool.

8. The electrically conductive fiber optic cable of claim 7, wherein the first and second protective polymer layers are of a material selected from a group consisting of a reinforced carbon fiber, a fluoropolymer, and a foamed polymer.

9. The electrically conductive fiber optic cable of claim 1, further comprising a second metal based cladding layer extending circumferentially about the first metal based cladding layer, wherein the second metal based cladding layer has a second thickness such that the second metal based cladding layer provides a second durable shell for the first metal based cladding layer, wherein one of the cladding layers is dedicated to power delivery and the other of the cladding layers is coupled to the downhole tool and used as a grounding return path.

10. The electrically conductive fiber optic cable of claim 1, wherein the single metal based cladding layer forms an exterior surface of the fiber optic cable, is coupled to the downhole tool and is used as a grounding return path for the downhole tool.

11. A coiled tubing assembly for use in an application at a location in a well at an oilfield with surface equipment positioned at a surface of the well, the coiled tubing assembly comprising:
- coiled tubing;
- an electrically conductive fiber optic cable run through a flow path of the coiled tubing; and
- a downhole tool coupled to the coiled tubing for advancement to the location in the well, the downhole tool telemetrically coupling to a polymer jacketed fiber optic thread run through a void space defined by a conduit of the fiber optic cable, the telemetric optical coupling for communications with the surface equipment and electrically coupling to a plurality of coaxial, conductive members helically wound about the conduit of the fiber optic cable, the conductive members located exteriorly adjacent the conduit in an un-insulated manner relative to the conduit, the electrical coupling providing dedicated power to the downhole tool from the surface equipment for the application, wherein the fiber optic cable comprises an insulating polymer layer over the conductive members, and a single metal based cladding layer extending circumferentially about the insulating polymer layer, wherein the metal based cladding layer has a thickness such that the metal based cladding layer provides a durable shell for the insulating polymer layer, wherein the single metal based cladding layer forms an external surface of the fiber optic cable, wherein the cladding layer is coupled to and used as an electrical grounding return path for the downhole tool.

12. The coiled tubing assembly of claim 11, wherein the downhole tool is a logging tool.

13. A method of performing a coiled tubing application at a location in a well at an oilfield, the method comprising:
- pumping a fiber optic cable through a flow path of a coiled tubing;
- physically coupling a downhole tool to the coiled tubing;
- communicatively coupling a polymer jacketed fiber optic thread through a void space defined by a conduit of the fiber optic cable to the downhole tool to support optical telemetric communications between the downhole tool and surface equipment at the oilfield;
- powerably coupling a plurality of coaxial, electrically conductive members adjacent the conduit of the fiber optic cable to the downhole tool to provide dedicated power thereto from the surface equipment, wherein the plurality of coaxial electrically conductive members are helically wound about the conduit and un-insulated relative to the conduit, wherein the fiber optic cable comprises an insulating polymer layer over the plurality of coaxial, electrically conductive members, a single metal based cladding layer extending circumferentially about the insulating polymer layer, and wherein the metal based cladding layer has a thickness such that the metal based cladding layer provides a durable shell for the insulating polymer layer;
- advancing the downhole tool to the location with the coiled tubing; and
- performing the coiled tubing application at the location.

14. The method of claim 13, further comprising utilizing the surface equipment to transmit commands to and receive information from the downhole tool.

15. The method of claim 13, further comprising utilizing the surface equipment to obtain data detected directly by the jacketed fiber optic thread.

16. The method of claim 13, wherein the metal based cladding layer forms an exterior surface of the fiber optic cable, is coupled to the downhole tool and is used as an electrical grounding return path for the downhole tool.

17. The method of claim 13, further comprising performing at least one wellbore operation with the coiled tubing and the fiber optic cable.

18. The method of claim 17, wherein the wellbore operation comprises at least one of a fluid pumping operation, a fracturing operation, an acidizing operation, a drilling operation, a coiled tubing operation, matrix stimulation, fill cleanout, scale removal, zonal isolation, perforation, downhole flow control, downhole completion manipulation, well logging, fishing, drilling, milling, measuring a physical property, locating a piece of equipment in the well, locating a particular feature in a wellbore, controlling a valve, and controlling the tool.

* * * * *